L. B. WYGANT.
KNOTTING MECHANISM.
APPLICATION FILED OCT. 22, 1907.

909,272.

Patented Jan. 12, 1909.
6 SHEETS—SHEET 1.

Witnesses
G. Howard Walmsley,
Edward F. Reed.

Inventor
Lewis B. Wygant,
By H. A. Toulmin,
Attorney

L. B. WYGANT.
KNOTTING MECHANISM.
APPLICATION FILED OCT. 22, 1907.

909,272.

Patented Jan. 12, 1909.
6 SHEETS—SHEET 4.

Witnesses
G. Howard Walmsley.
Edward F. Reed

Inventor
Lewis B. Wygant,
By H. A. Toulmin
Attorney

UNITED STATES PATENT OFFICE.

LEWIS B. WYGANT, OF BELLEVUE, OHIO, ASSIGNOR OF ONE-HALF TO THE OHIO CULTIVATOR COMPANY, OF BELLEVUE, OHIO, A CORPORATION OF OHIO.

KNOTTING MECHANISM.

No. 909,272.  Specification of Letters Patent.  Patented Jan. 12, 1909.

Application filed October 22, 1907. Serial No. 398,652.

*To all whom it may concern:*

Be it known that I, LEWIS B. WYGANT, a citizen of the United States, residing at Bellevue, in the county of Huron and State of Ohio, have invented certain new and useful Improvements in Knotting Mechanism, of which the following is a specification, reference being had therein to the accompanying drawings.

This invention relates to knotting mechanism, and more particularly to mechanism for automatically tying or fastening together the ends of bale wires employed in binding a bale of hay or other material.

The object of the invention is to provide a mechanism of this character which will be simple in construction, comprising but a few parts, and simple in its operation, wherefore there will be little liability of the parts becoming disarranged or broken in operation; to provide adequate means for clamping the bale wires in position while the knotting mechanism is in operation; to provide suitable means for cutting the wire at the proper point; and further, to so improve the construction and arrangement of the mechanism as a whole as to improve the operation thereof and render the same accurate and certain in its operation.

With these objects in view my invention consists in certain novel features of construction and in certain parts and combinations hereinafter to be described, and then more particularly pointed out in the claims.

In the accompanying drawings.

In these drawings, I have illustrated my invention as embodied in an automatic-tying hay press of known construction, the main features of construction and operation of the press and the power transmission mechanism being shown and described in the patents granted to me Nov. 10, 1903, and Dec. 4, 1906 and numbered 743,998 and 837,530, respectively, and in the application filed by me on the 3rd day of December, 1906, Ser. No. 345,994.

Figure 1:
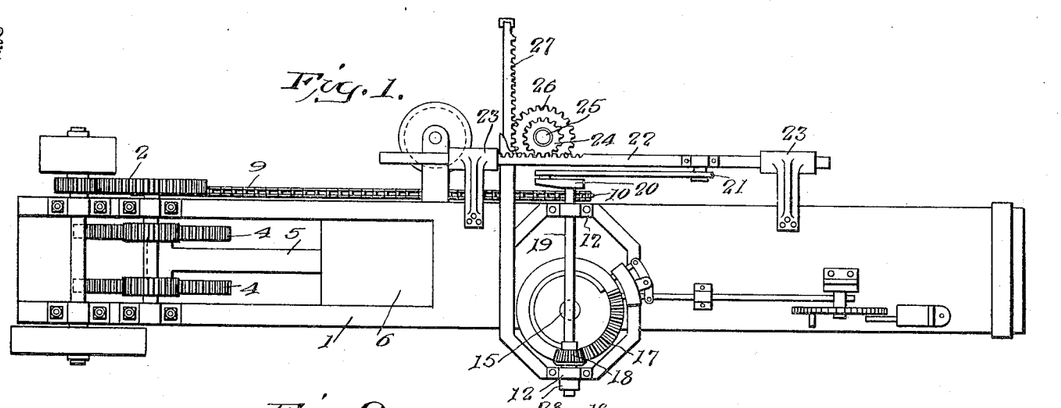
Figure 1 is a top plan view of a baling press embodying my invention.
Figure 2:
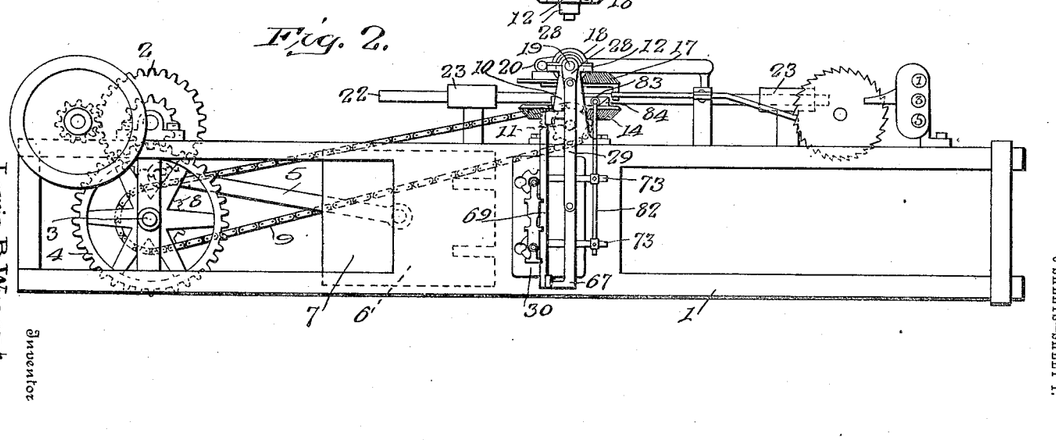
Fig. 2 is a side elevation of the same.
Figure 3:
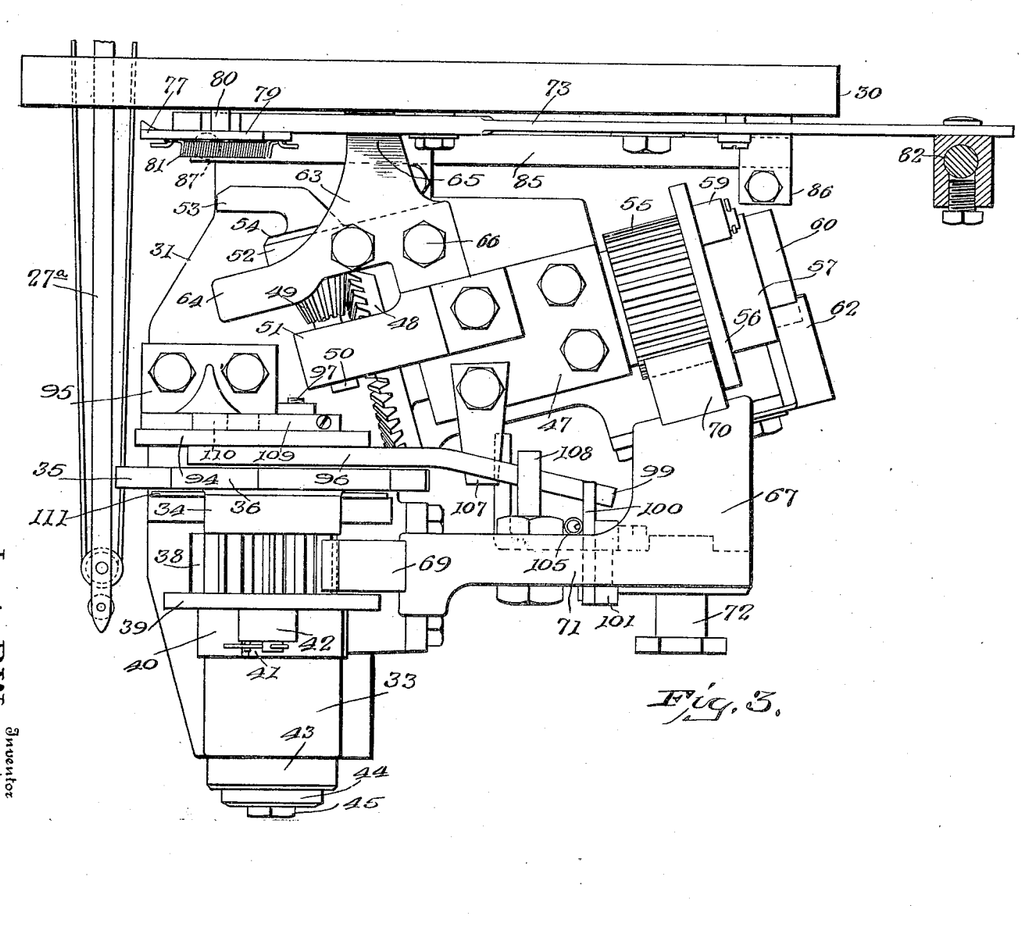
Fig. 3 is a top plan view of the knotting mechanism.

The press as a whole is indicated by the reference numeral 1 and has mounted at one end thereof suitable gearing 2 adapted to be actuated from any suitable source of power and to rotate the gears 4, which are mounted on stud shafts 3 and have connected thereto one end of a pitman 5, the other end of which is connected to a plunger 6 in the compression chamber 7. A sprocket wheel 8 is also mounted on one of the shafts 3 and is connected by means of a sprocket chain 9 with a sprocket wheel 10 mounted on a horizontal shaft 11 journaled in a suitable bearing formed in the brackets 12 which are mounted upon the press. This shaft 11 is provided with a suitable bevel pinion, adapted to mesh with a bevel gear 14 mounted on a vertical shaft 15 which also has mounted thereon, above the beveled gear 14, a mutilated bevel gear 17, which is adapted to mesh with a bevel pinion 18 on a second horizontal shaft 19, which is also journaled in bearings in the brackets 12 and is provided on one end with a crank arm 20 which is connected by means of a suitable pitman 21 with a rack-bar 22 extending longitudinally of the press and slidably mounted in bearings 23 mounted on the frame of said press 1. The rack-bar 22 is adapted to engage a pinion 24 mounted on a vertical shaft 25 upon which are mounted one or more gears 26 adapted to mesh with a rack or racks 27 extending transversely of the press, connected with and adapted to operate the needle bar or bars 27ª, (Fig. 3), which feed the wire from the spool across the compression chamber and about the bale within the same. The shaft 19 is provided at its opposite end with a second crank arm 28, to which is pivotally connected a pitman 29 adapted to actuate the knot-forming mechanism.

The knot-forming mechanism is mounted upon a suitable frame comprising a vertical member 30 adapted to be secured to the wall of the baling chamber and having one or more horizontal brackets or supporting members 31 secured thereto. A suitable shaft 32 is journaled in bearing lugs 33 and 34 carried by one of the brackets 31 and extends in a direction substantially parallel with the length of the wires when the same are fed transversely of the compression chamber by the needle bar 27ᵃ. Mounted upon the inner end of the shaft 32 and beyond the bearing 34 is a disk 35 having a series of recesses 36 formed at intervals about the periphery thereof. In the present instance, there are four of these recesses and the walls of the same are curved in the manner shown so as to provide a series of hooks 37 about the periphery of the disk. Loosely mounted upon the shaft 32, and preferably between the bearing lugs 33 and 34, is a mutilated pinion 38 having rigidly secured to one side thereof a disk 39, preferably of a diameter somewhat greater than the diameter of the pinion. Rigidly secured to the shaft 32 and on the side of the disk 39 opposite the pinion 38 is a ratchet or collar 40 having a series of recesses 41 in the periphery thereof, which recesses are adapted to be engaged by the spring-pressed pawls 42, secured to the adjacent side of the disk 39, and to rotate the collar 40 and the shaft 32 when the pinion 38 is rotated in one direction and to permit the collar 40 and the shaft 32 to remain stationary when the pinion is rotated in the opposite direction. The shaft 32 is provided on its outer end with a suitable collar or washer 43 and a bearing plate 44, adapted to be secured to the end of the shaft 32 and against the collar 43 by a suitable screw 45, thereby holding the shaft against longitudinal movement and permitting the same to rotate freely in its bearings. A second shaft 46 is journaled in a suitable bearing 47 mounted on the member 31 and extends at an angle to the shaft 32, which angle, in the present instance, is somewhat greater than a right angle. This shaft is provided on its inner end with a bevel gear 48, adapted to mesh with a bevel pinion 49 rigidly secured to a short shaft 50 which is journaled in suitable bearings 51 and 52 mounted on the member 31. One end of the shaft 50 has secured thereto a knotter arm or twister 53 which is adapted to be rotated about a transverse horizontal axis and which extends at substantially right angles to the length of the shaft 50 and may be secured thereto in any suitable manner, being shown in the present instance as formed integral therewith and provided with a bearing plate 54 adapted to engage the bearing 52 to prevent longitudinal movement of the shaft 50 in one direction, such movement in the other direction being prevented by the pinion 49.

A pinion 55 is loosely mounted on the shaft 46 near the opposite end thereof and has secured thereto a suitable disk 56 which is preferably of a diameter greater than the diameter of the pinion 55. A suitable ratchet or collar 57 is rigidly secured to the shaft 46 on the side of the disk 56 opposite that to which the pinion 55 is secured and is provided with suitable recesses 58 adapted to be engaged by spring-pressed pawls 59 which are pivotally mounted on the adjacent side of the disk 56, whereby the rotation of the pinion 55 in one direction will cause the shaft 46 to rotate and impart movement to the twister 53, while the rotation of said pinion in the opposite direction will not affect the shaft or twister. A disk 60 is rigidly secured to the shaft 46 beyond the collar 57 and is provided with a recess 61 adapted to receive the end of a spring pawl 62, as shown.

A suitable guide 63 is mounted adjacent to the twister or knotter arm 53 to control the movement of the free ends of the wires in which the knot is being formed. This guide may be of any suitable construction, but, as here shown, comprises a plate having two arms arranged at substantially right angles one to the other and having their adjacent edges curved and adjoining, whereby the guiding surface is in the form of a continuous curve. One of the arms 64 extends in a direction substantially parallel with the twister 53 when the same is in its idle position and the other arm 65 extends at substantially right angles to the arm 64 and having its outer end slightly depressed and terminating close to the vertical member 30 of the supporting frame and preferably in contact with that member. The plate forming the guide 63 may be supported in any suitable manner, but I have here shown the same as secured to the supporting bracket 31, by means of suitable screws 66, at a point adjacent to the bearing 47. A vertically reciprocating rack-bar frame 67 is mounted in suitable slide bearings 68 carried by the supporting frame and is provided with suitable rack-bars 69 and 70 adapted to engage the pinions 38 and 55, respectively, the rack-bar frame being provided with angular brackets 71 adapted to support the rack-bars 69 and 70 in their proper positions to engage their respective pinions. A vertically reciprocating movement is imparted to the rack-bar frame 67 by means of the pitman 29, the lower end of which is pivotally connected to a wrist pin or bearing-stud 72 secured to said rack-bar frame.

Suitable means are provided for clamping the bale wires and holding the same against movement during the operation of the knotting mechanism. This mechanism preferably comprises a lever 73 pivotally connected to the vertical member 30 of the supporting frame 3 as shown at 74, and has at its outer end a downwardly extending projection or lip 75 adapted to engage the wires and clamp the same firmly in engagement with a part carried by the member 30 which extends beneath the wires and preferably has a groove 76 formed in the upper surface thereof.

To insure the proper positioning of the wires to be engaged by the clamping mechanism and by the twister I prefer to provide the clamping mechanism with means for engaging said wires and moving the same to a position beneath the lip 75, and, to this end, the arm 77, having its lower end inclined downwardly and outwardly, as shown at 78, and extending to a point somewhat below and beyond the outer edge of the lip 75, is pivotally mounted on the outer end of the lever 73 and has a projection or finger 79 extending at an angle thereto and adapted to engage a pin or projection 80, preferably secured to the member 30, as the lip 75 moves downwardly, thus moving the lower end of the arm 77 inwardly and causing the wires to be engaged by the inclined surface thereof, and moved to a position beneath the lip 75. A spring 81, connected at one end to the arm 77, above the point of pivotal connection to the lever 73, and at its other end to said lever, serves to return the arm to its normal position and retain the same in that position when the lever is not in operation. The lever 73 may be rocked about its pivotal center to actuate the clamping mechanism in any suitable manner, but I prefer to connect the same to a rod 82 which extends upwardly to a point adjacent to the upper bevel gear 14 of the transmission gear and has at its upper end a roller 83 adapted to engage a cam 84 carried by said gear, which is so arranged with reference to the operation of the knotting mechanism that the cam will engage the roller 83 and actuate the rod 82 and lever 73 at the proper time to clamp the wires and hold the same in position during the twisting operation.

Figure 15:
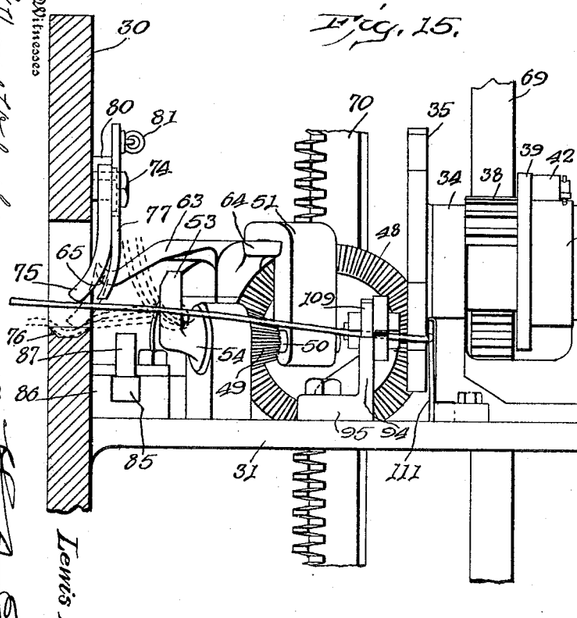
Fig. 15 is a side elevation of the knotting mechanism.

In Fig. 15 of the drawings I have shown in dotted lines the lip 75 in engagement with the wires and the knot partially formed. Suitable means are also provided for disengaging the knot from the twister or knotter arm after the knot has been completed. This means, in the form here shown, consists of a bar 85 slidably mounted in suitable bearing lugs 86 carried by the supporting bracket 31 and has an upwardly extending pin or projection 87 on the end adjacent to the twister. This bar is so actuated that, when the clamping mechanism is moved to its operative position, the bar 85 and pin 87 will be moved rearwardly or away from the twister and the wires, and, when the knot has been formed and the clamping mechanism moves to its inoperative position, the bar will be moved forwardly to bring the pin 87 into engagement with the wires, thus forcing the knot off of the knotter arm and allowing the bale about which the wire extends to be removed. The means for so actuating the bar preferably consists of a bell crank lever 88, having its lower end slotted, as shown at 89, to receive the pin 90 carried by the bar 85 and having its other end connected by means of a link 91 with the outer end of the lever 73, whereby the downward movement of the inner end of the lever 73 or the end carrying the lip 75, will cause the bar 85 to move outwardly or in a direction away from the knotter arm. Both the outer end of the bell crank lever 88 and the lever 73 are provided with a series of apertures 92 and 93, respectively, whereby the link 91 may be adjustably secured thereto and the throw of the lower end of the bell crank lever regulated.

The cutting mechanism, which I have provided for severing the bale wire from the coil, may be of any suitable description, that which I have herein shown comprising a cutting member 94 provided with a cutting edge and secured to a bracket 95 which is mounted on the supporting bracket 31 adjacent to the recessed disk 35. A movable cutting member is mounted adjacent to the cutting member 94 and is adapted to coöperate therewith to sever the wire and this movable member preferably comprises a lever 96 pivotally mounted on the bracket 95 by means of a bolt 97 and having its inner end 98 provided with a cutting edge and its outer end 99 forming an actuating arm, by means of which movement is imparted to the inner end thereof. The rack bar frame 67 is preferably provided with an inwardly extending projection or finger 100 which is pivotally secured to a bracket 101 which is adjustably mounted on the rack-bar frame 67 by means of a vertical slot 102 and a screw 103 extending through said slot and engaging said frame. The bracket 101 is preferably recessed to form a shoulder 104 adapted to engage the lower edge of the finger 100 to limit the downward movement thereof, the finger being held normally in engagement with said shoulder by means of a spring 105 having one end connected to said finger and the other end connected to said bracket. As the frame moves upwardly, the upper edge of the finger 100 will engage beneath the arm 99 and move the same about its pivotal center, and, as the arm 99 reaches the upper limit of its movement, the finger 100 will slip off the outer end thereof and continue its upward movement. A spring 106 having one end connected to the arm 99 and the other end secured to a fixed part of the supporting frame, serves to return the arm 99 to its lowermost position, which position is fixed by a stop 107 extending outwardly from the supporting frame, and to retain the cutting mechanism in its inoperative position. A suitable projection or pin 108 is mounted on the rack-bar frame 67 above the arm 99 and is adapted to engage the same as the said frame moves downwardly to return the arm 99 to its lowermost position in case the cutting mechanism may become wedged or for any reason fail to return to its operative position. A spring clip 109 is secured to the upper edge of the bracket 95 and has at its outer end a downwardly extending projection 110 adapted to extend over the ends of the wires and retain the same in position after they have been cut.

In the operation of the device power is transmitted to the transmission gear by means of the gearing 2 and sprocket chain 9 and the shaft 19 rotated at intervals, the intervals of rotation being controlled by the mechanism set forth in the above mentioned patents and which forms no part of the present invention. As the shaft 19 and crank arm 20 rotate, motion is imparted to the rack 22 and the needle bar 27ª, and said needle bar is moved across the compression chamber and the wire carried across the end of the bale which has been formed, thus passing the wire completely about the bale. The free end of the needle bar 27ª projects beyond the side of the compression chamber adjacent to the knotting mechanism in the position shown in Fig. 3, thus carrying the wire within the path of the hook formed on the disk 35. The continued rotation of the shaft 19 brings into operation the vertically reciprocating rack-bar frame 67, whereby the rack-bar 69 rotates the mutilated pinion 38 and shaft 32 to impart motion to the disk 35. The teeth on the mutilated pinion and on the rack-bar 69 are so proportioned that the disk 35 is moved through one quarter of a revolution. During this movement, the wire which lies in the path of the hook 37 is engaged thereby and carried inwardly under the projection 110 of the holding clip and between the cutting members 94 and 98 of the cutting mechanism. That portion of the wire lying beyond the cutting mechanism is bent about the disk and is drawn between the same and a resilient clip or member 111, thus locking that end of the wire firmly in position and holding the same against retraction when the wire has been cut. While the wires are being moved into this position the cam on the gear 14 of the transmission gearing has engaged the roller on the rod 80 and operated the clamping mechanism, whereby the arm 77 is actuated to move the wires beneath the lip 75 and that lip is moved firmly into engagement with the wires, thereby holding the same against movement until the roller has again passed off the cam 84. As the rack-bar frame 67 continues its upward movement, the finger 100 engages the arm 99 of the cutting mechanism and actuates said mechanism to sever the ends of the wires, thereby leaving both ends free. These end portions are engaged intermediate their extreme ends and the clamping mechanism by the knotting finger or twister 53 which presses the central portion thereof upward, bringing the outer portions against the under side of the arm 64 and bending these ends back upon that portion of the wire lying on the opposite side of the twister, thus bending the end portions upon themselves. As the twister continues its rotation about its transverse axis the ends of the wires travel along the guide 63 and are held against rotation while the twister 53 completes a series of rotations, thus twisting the ends of the wires together and forming a firm knot. When the twister has made a sufficient number of revolutions to form the knot, the roller of the rod 82 passes off the cam and the clamping mechanism is released and the bar 85 and pin 87 move forwardly to force the knot off of said twister, thus releasing the same and permitting the bale to be removed. Should the strain exerted upon the knot by the bale tend to untwist the wires, which is improbable owing to the stiffness thereof, the projecting ends of the wires will come into engagement with the side of the bale and thus effectually prevent the knot from turning and the ends of the wire from being untwisted.

Figures 4, 5, 6, 14:
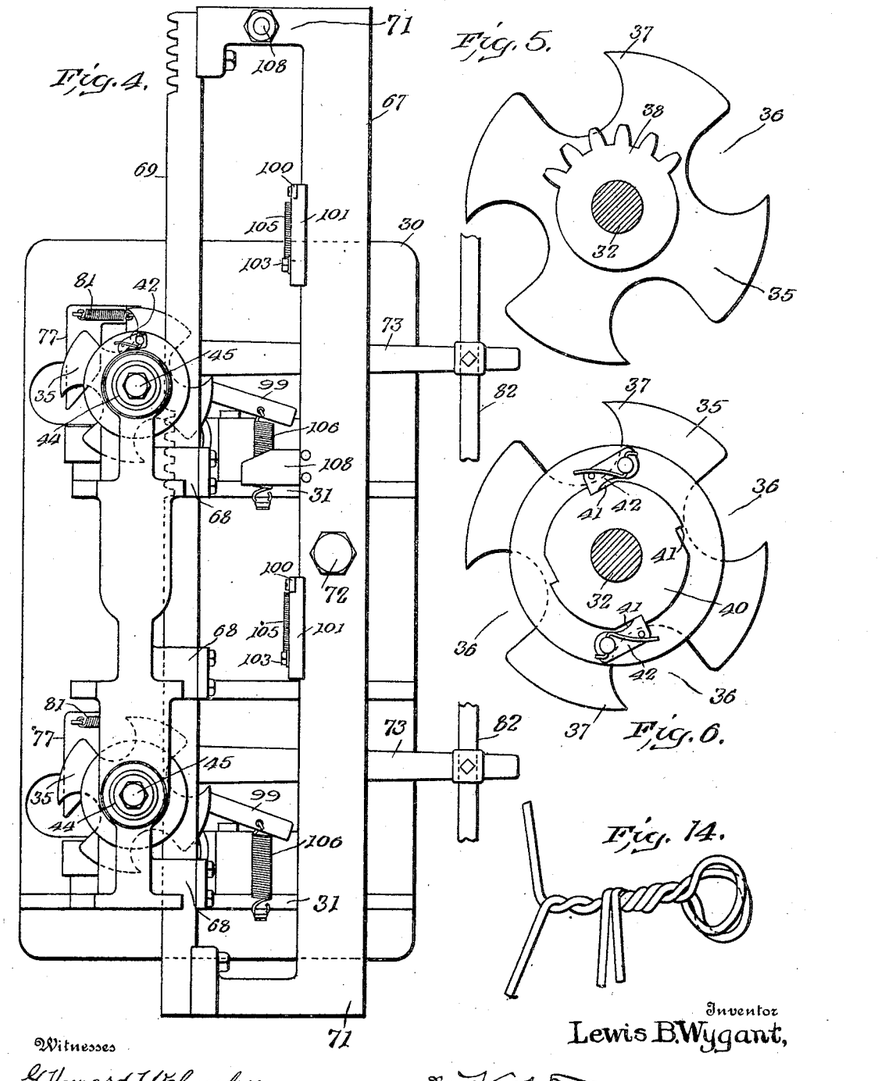
Fig. 4 is a front elevation of the same.
Fig. 5 is a detail view of the disk and mutilated pinion.
Fig. 6 is a detail view of the disk and its actuating ratchet.
Fig. 14 is a detail view of a knot formed by my knotting mechanism.
Figure 7:
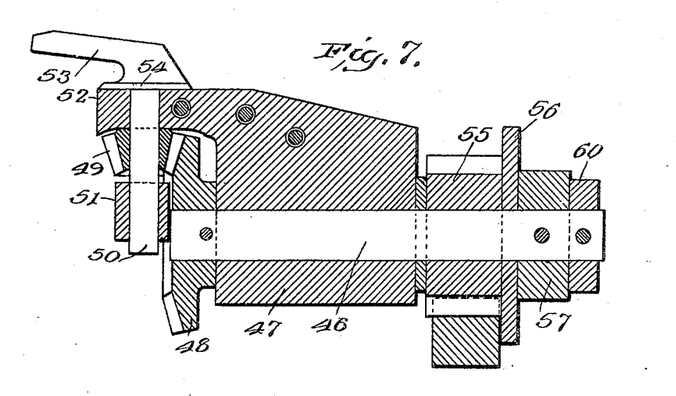
Fig. 7 is a detail view, partially in section, of the twister or knot-forming mechanism.
Figure 8:
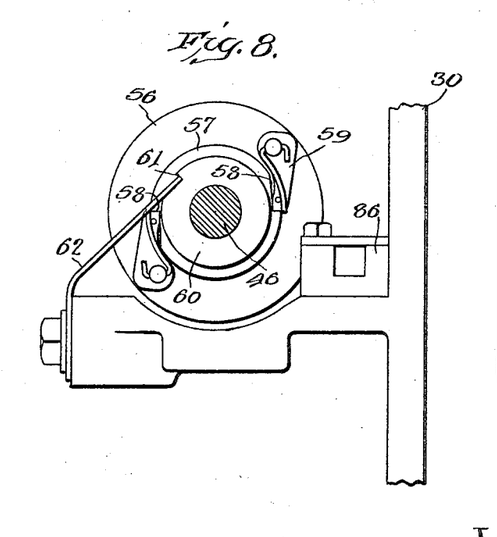
Fig. 8 is an end view of the operating mechanism for said twister.
Figure 9:
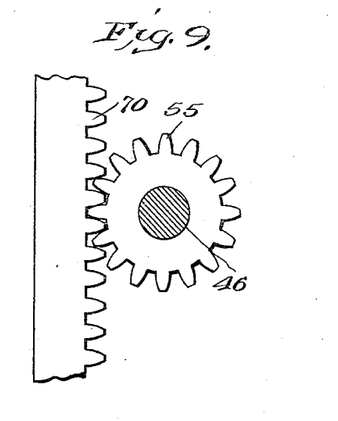
Fig. 9 is a detail view of the rack and pinion forming part of said operating mechanism.
Figure 10:
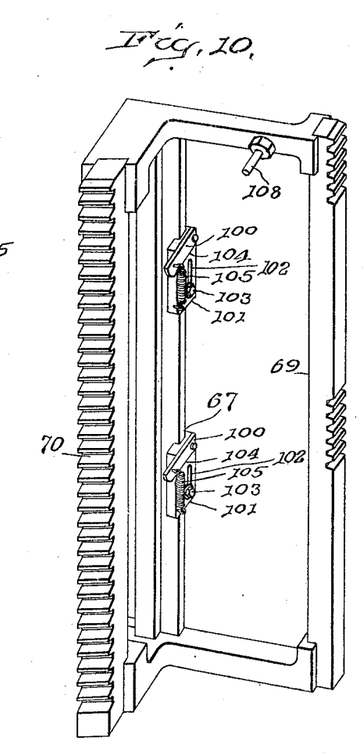
Fig. 10 is a detail view of the rack-bar frame.
Figure 11:
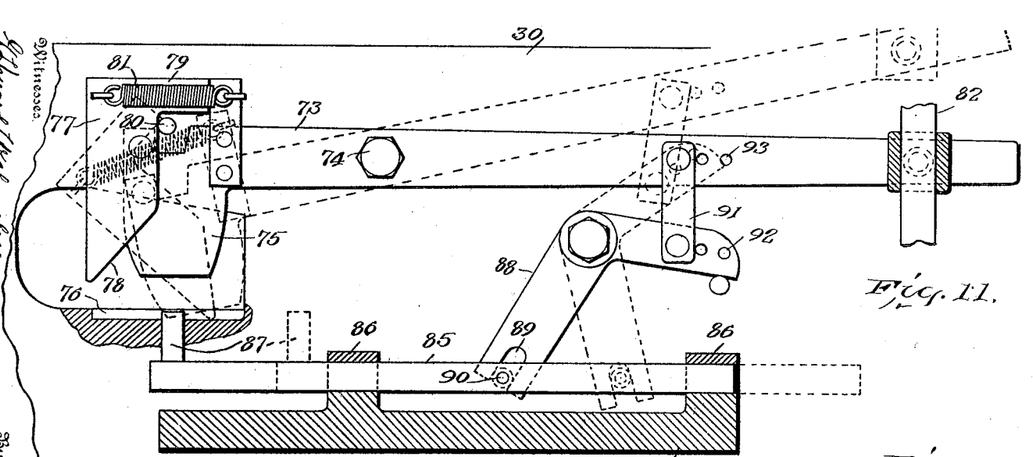
Fig. 11 is a detail view of the clamping mechanism.
Figure 12:
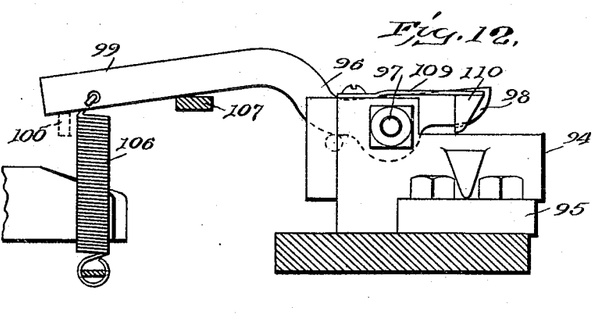
Fig. 12 is a detail view of the cutting mechanism.
Figure 13:
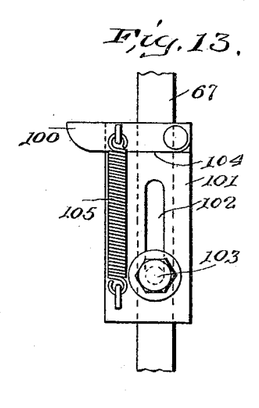
Fig. 13 is a detail view of the actuating finger for said cutting mechanism.

I have here shown and described mechanism for forming a single knot in one of the wires of the bale, but it will be readily understood that the device may be arranged to knot any number of wires by simply duplicating the apparatus here described. Fig. 4 shows knotting mechanism arranged for tying two wires. Further, I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a device of the character described, the combination, with mechanism for passing a resilient member about the material to be bound, of gripping mechanism, cutting mechanism located beyond said gripping mechanism, and twisting mechanism located between said gripping mechanism and said cutting mechanism.

2. In a device of the character described, the combination, with mechanism for passing a resilient member about the material to be bound and means for cutting said resilient member, of means for bending the free end portions of said resilient member upon themselves and twisting together said end portions.

3. In a device of the character described, the combination, with mechanism for passing a resilient member about the material to be bound, of means for gripping said resilient member at points removed from the ends thereof to hold the same in position, and means for twisting together those portions of the resilient member lying beyond said holding means.

4. In a device of the character described, the combination, with mechanism for passing a resilient member about the material to be bound, and means for gripping said resilient member to hold the same in position, of means for severing said resilient member at a point beyond said gripping means, and means beyond said gripping means for twisting together the free ends of said resilient member.

5. A knotter of the character described comprising means for holding a wire, a guide for the free ends of said wire, and a rotatable arm adapted to coöperate with said guide to twist together the ends of said wire.

6. A knotter of the character described comprising an arm adapted to rotate about a transverse axis, and a guide for a wire consisting of two stationary arms, one extending substantially parallel with said rotatable arm when the same is in its idle position, and the other extending at an angle to the first-mentioned stationary arm.

7. A knotter of the character described comprising an arm adapted to rotate about a transverse axis, means for moving the wire into the path of said rotatable arm, clamping mechanism on one side of said arm for securing said wire in its adjusted position, and cutting mechanism located on the opposite side of said rotatable arm.

8. A knotter of the character described, comprising a curved guide, a shaft rotatably mounted beneath said guide, an arm carried by said shaft and extending at an angle thereto and adapted to be rotated about a transverse axis to engage a wire and twist together the ends thereof.

9. A knotter of the character described comprising a shaft having a bevel pinion on one end thereof, means for rotating said shaft, a second shaft extending at an angle to said first mentioned shaft, a bevel pinion carried by said second shaft and adapted to mesh with the bevel gear on the first-mentioned shaft, an arm carried by said second shaft, extending at an angle thereto and adapted to engage a wire, and a guide located adjacent to said arm for controlling the movement of the end of said wire when the same is engaged by said arm.

10. A knotter of the character described comprising means for holding a wire, an arm, means for rotating the same about a transverse axis, whereby said arm is caused to engage the wire beyond said holding means, and means for controlling the movement of the free ends of said wire.

11. In a knotter of the character described, the combination, with a frame, and a knot-forming mechanism carried thereby, of a clamp, adapted to hold a wire while the knot is being formed, comprising a part extending beneath the wire, and a lever pivotally mounted on said frame having a part adapted to engage the wire and clamp the same against the first-mentioned part.

12. In a knotter of the character described, the combination, with a frame, and knot-forming mechanism carried thereby, of a clamp, adapted to hold a wire while the knot is being formed, comprising a part extending beneath the wire and having a groove in its upper edge, a lever pivotally mounted on said frame having a depending lip adapted to engage the wire and clamp the same against said grooved part.

13. In a knotter of the character described, the combination, with a frame, and a knot-forming mechanism carried thereby, of a clamp adapted to hold a wire while the knot is being formed, comprising a part extending beneath the wire, a lever pivotally mounted on said frame having a part adapted to engage the wire and clamp the same against the first-mentioned part, and means carried by said lever for moving the wire between said clamping parts.

14. In a knotter of the character described, the combination, with a frame, and knot-forming mechanism carried thereby, of a clamp adapted to hold a wire while the knot is being formed, comprising a part extending beneath the wire, a lever pivotally mounted on said frame having a part adapted to engage the wire and clamp the same against the first-mentioned part, a finger pivotally mounted on said lever, and means for moving said finger about its pivotal center when said lever is moved towards its clamping position.

15. In a knotter of the character described, the combination, with a frame, and knot-forming mechanism carried thereby, of a clamp adapted to hold a wire while the knot is being formed comprising a part extending beneath the wire, a lever pivotally mounted on said frame, having a part adapted to engage the wire and clamp the same against the first-mentioned part, a pin mounted on said frame, an arm pivotally mounted on said lever and having a finger adapted to engage said pin as said arm is moved downwardly to its clamping position.

16. In a knotter of the character described, the combination, with means for holding a wire, a guide, and a rotatable arm adapted to coöperate with said guide to twist together the free ends of the wire, of means for removing the twisted ends of said wire from said arm.

17. In a knotter of the character described, the combination, with a guide, a rotatable arm adapted to coöperate with said guide and twist together the ends of a wire, and a clamp adapted to engage said wire and hold the same during said twisting operation, of means actuated by said clamping mechanism for removing the twisted ends of said wire from said arm.

18. In a knotter of the character described, the combination, with a knot-forming mechanism, a clamp comprising a lever pivotally mounted between its ends, and means for actuating said lever, of a bar slidably mounted near said knot-forming mechanism, a projection carried by said bar, and means for operatively connecting said bar to said lever, whereby the movement of said lever will move the pin carried by said bar toward or away from the knot on said knot-forming mechanism.

19. In a knotter of the character described, the combination, with a frame, knotting mechanism mounted thereon, and a reciprocating member adapted to operate said knotting mechanism, of cutting mechanism comprising a fixed member having a cutting edge, a pivoted member having a cutting edge, an arm carried by said pivoted member, and a part carried by said reciprocating member adapted to engage said arm to actuate said pivoted member.

20. In a knotter of the character described, the combination, with a frame, knotting mechanism mounted thereon, and a reciprocating member adapted to operate said knotting mechanism, of cutting mechanism comprising a fixed member having a cutting edge, a pivoted member having a cutting edge, an arm carried by said pivoted member, a finger pivotally mounted on said reciprocating member and adapted to engage said arm, and a stop to limit the movement of said finger.

21. In a knotter of the character described, the combination, with a frame, knotting mechanism mounted thereon, and a reciprocating member adapted to operate said knotting mechanism, of cutting mechanism comprising a fixed member having a cutting edge, a pivoted member having a cutting edge, an arm carried by said pivoted member, a pivoted arm adjustably mounted on said reciprocating frame and adapted to engage said arm, a spring adapted to move said finger in one direction, and a stop to limit the movement thereof.

In testimony whereof, I affix my signature in presence of two witnesses.

LEWIS B. WYGANT.

Witnesses:
E. H. ERDRICH,
EVERT A. KEMP.